No. 854,699. PATENTED MAY 21, 1907.
J. NASH.
VEHICLE WHEEL.
APPLICATION FILED MAR. 16, 1906.
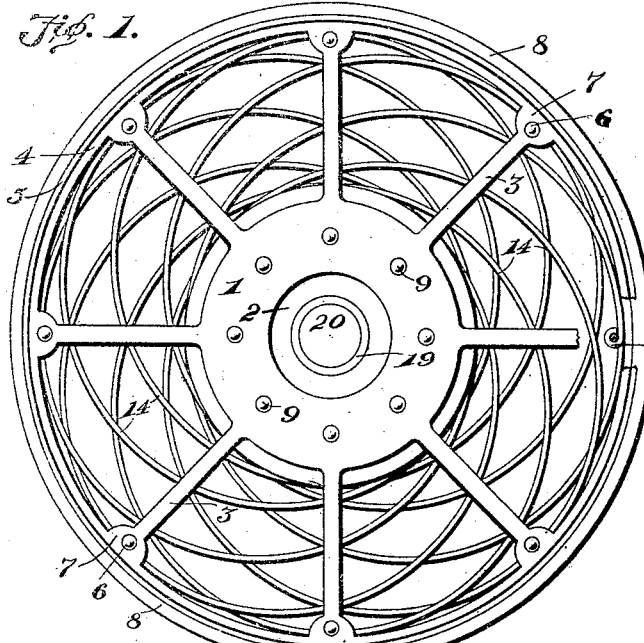
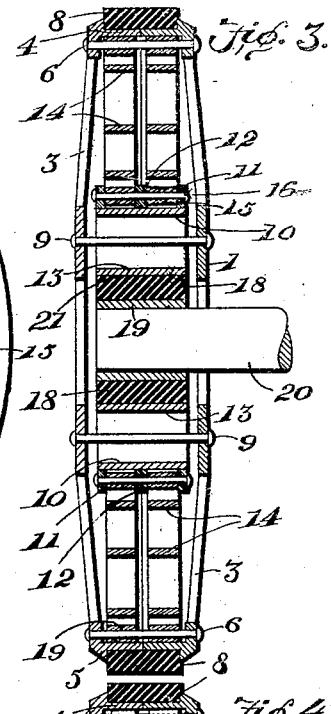
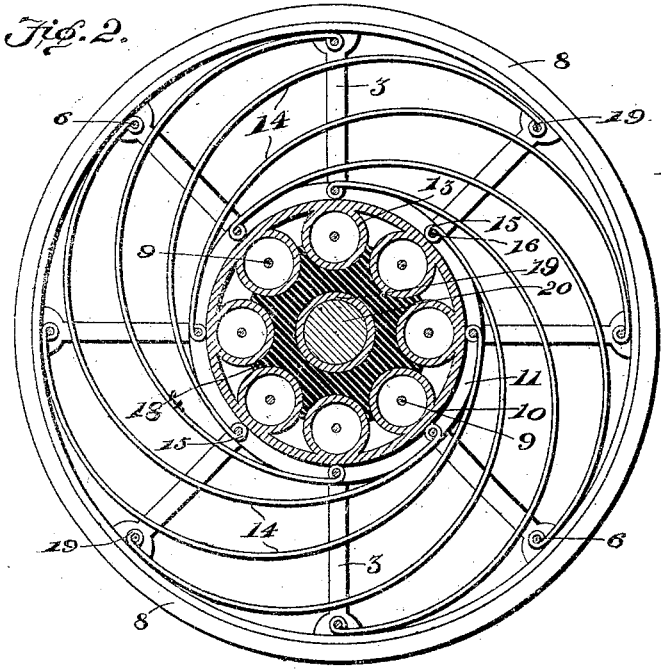
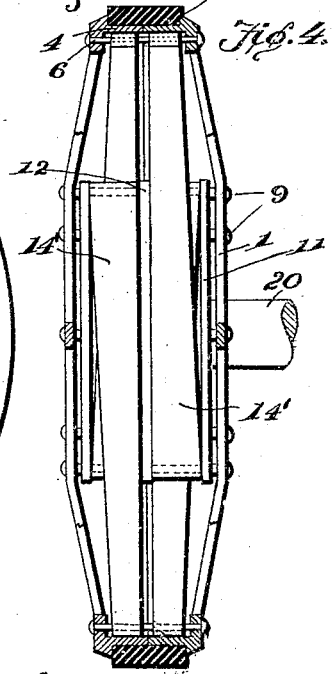
WITNESSES:
John Nash, INVENTOR.
By C. A. Snow & Co.
ATTORNEYS

UNITED STATES PATENT OFFICE.

JOHN NASH, OF NORTH YAKIMA, WASHINGTON, ASSIGNOR OF ONE-HALF TO JOHN J. TYLER, OF NORTH YAKIMA, WASHINGTON.

VEHICLE-WHEEL.

No. 854,699.  Specification of Letters Patent.  Patented May 21, 1907.

Application filed March 16, 1906. Serial No. 306,450.

*To all whom it may concern:*

Be it known that I, JOHN NASH, a citizen of the United States, residing at North Yakima in the county of Yakima and State of Washington, have invented a new and useful Vehicle-Wheel, of which the following is a specification.

This invention relates to vehicle wheels, and is designed to provide for cushioning the same at the hub thereof rather than at the rim of the wheel, and to accomplish these results in a new and novel manner without in any degree reducing the strength and durability of the wheel.

It is furthermore designed to enable the convenient assemblage of the wheel, and to permit replacing of any broken parts thereof.

With these and other objects in view, the present invention consists in the combination and arrangement of parts as will be hereinafter more fully described, shown in the accompanying drawing and particularly pointed out in the appended claims, it being understood that changes in the form, proportion, size and minor details may be made, within the scope of the claims without departing from the spirit or sacrificing any of the advantages of the invention.

In the drawing: Figure 1 is a side elevation of a wheel embodying the features of the present invention. Fig. 2 is a similar view with one of the side members of the wheel removed. Fig. 3 is a cross sectional view of Fig. 1. Fig. 4 is an edge view of the wheel having its rim broken away and disclosing a modified form of spring.

Like characters of reference designate corresponding parts in all of the figures of the drawing.

The present wheel includes a rigid skeleton frame structure within which is centrally hung a hub which is elastically yieldable. The frame includes duplicate half sections, each section including a central body member 1 having a concentric opening 2, thereby producing a ring-shaped body. From this body radiate spokes 3, which are preferably integral and are connected at their outer ends by a circular rim 4 which is provided at its outer edge with an annular flange 5. It will here be explained that the parts of each rim member are integral and therefore may be of cast metal. The frame members are assembled face to face, as in Figs. 3 and 4, and are connected by means of bolts or other fastenings 6 which are passed through the enlarged outer terminals 7 of corresponding spokes, with the inner edges of the rims 4 abutted, whereby an annular channel is formed entirely around the rim of the wheel for the reception of a solid yieldable tire 8, preferably a rubber ring. The frame members are furthermore connected by an annular series of fastenings 9 piercing the opposite body members 1 in alinement with the respective spokes.

The hub 10 of the wheel is an open ended cylinder of substantially the diameter of the body members 1, and provided with external annular end flanges 11 and an intermediate annular flange 12. The fastenings 9 of course extend longitudinally through the cylinder and are normally disposed concentric with respect to an annular series of open ended sleeves 13 carried by the inner periphery of the cylinder and preferably integral therewith.

Extending between the hub and the rim of the wheel are two sets of springs, one set at each side of the intermediate annular flange 12 of the hub. Each spring 14 consists of a flat spring bar which is bowed into substantially semi-circular shape, with its inner end terminating in an eye 15 embracing a bolt, rivet, or suitable fastening 16 which also passes through the flanges 11 and 12. The outer end of the spring terminates in an eye 19 embracing the adjacent fastening 6 which connects the rims of the wheel sections. The eyes, of course, loosely embrace the fastenings so as to rock thereon when the springs are under tension. The springs of one set are disposed between the intermediate flange 12 and one of the flanges 11, while the other set are disposed between the intermediate flange 12 and the other flange 11, whereby the two sets of springs lie in substantially parallel planes.

Occupying the middle of the hub there is a cushion 18, preferably of rubber which has a concentric opening in which is snugly fitted a metallic sleeve or boxing 19 for the reception of the adjacent end of the axle 20. The outer periphery of the cushion 18 has a generally circular form, and is provided at regular intervals with concaved seats 21 snugly receiving the respective sleeves 13, whereby the cushion is held against creeping.

From the foregoing description, it will be understood that the duplicate half sections of the wheel constitute a rigid frame in which the hub is yieldably supported by the springs 14, whereby the hub is capable of yielding independently of the rigid frame of the wheel, thereby to effectually cushion any jars to which the wheel is subjected. It will here be explained that the rubber tire 8 is not employed to cushion the wheel so much as it is employed to reduce the noise thereof when the wheel is running.

Should the wheel become overloaded, there would be too much strain upon the springs, and to relieve the springs of such strain is the function of the rubber cushion 18 which comes into play when the vehicle is loaded sufficiently to force the hub downward until the sleeves 13 come into contact with and are supported by the fastenings 9, whereupon said fastenings will constitute a rigid support for the hub, and the elastic part 18 will then constitute a cushion between the hub and the arms 9 and thereby relieve the springs of further strain.

By reference to Fig. 1 of the drawing, it will be understood that the springs of one set extend in one direction from the hub, and the springs of the other set extend in the opposite direction, wherefore the hub will always be centered within the wheel in the normal condition of the latter, as the tendency of the springs of one set is offset by the tendency of the springs of the other set to move the hub laterally within the wheel.

Upon reference to Fig. 4 of the drawing, it will be noted that I contemplate employing a slightly different shape of spring, designated 14', which tapers outwardly from its inner end, whereby its inner end is stiffer than its outer end which tends to prevent dishing of the wheel, otherwise the construction of the wheel is the same as hereinbefore described.

Having thus described the invention, what is claimed is:

1. A wheel comprising a rigid frame made up of complementary half sections, each section including a central body having an axle opening, spokes radiating from the body, and a rim connecting the outer ends of the spokes, fastenings connecting corresponding spokes of the two sections, a hub independent of the wheel sections, springs extending between the hub and the fastenings and means within the hub for limiting its movement.

2. A wheel comprising a rigid frame, a hub independent of the frame, springs extending between the hub and the frame to yieldably support the hub, a cushion carried by the hub, and an annular series of stops carried by the frame and disposed in position to be cushioned when the hub is displaced beyond a predetermined limit.

3. A wheel comprising a rigid frame, an open ended hub independent of the frame, springs connecting the hub and the frame, an annular series of pins carried by the frame and extending through the open ends of the hub, a cushion carried by the hub within the area bounded by the pins, the pins constituting stops adapted to be cushioned when the hub has been displaced beyond a predetermined limit.

4. A vehicle wheel comprising a rigid frame, an open ended hub within the frame, springs connecting the hub and the frame, open ended sleeves rigidly carried within the hub, a cushion snugly embraced by the sleeves, and pins carried by the frame and extending through the open ends of the sleeves, said pins constituting stops for engagement by the sleeves when the hub has been displaced to a predetermined limit.

5. In a vehicle wheel, the combination of complementary frame sections, each section including a central body having an axle opening, spokes radiating from the body and a rim connecting the spokes, an annular series of fastenings connecting the outer ends of corresponding spokes, an inner annular series of fastenings connecting the bodies of the frame sections, an open ended hub embracing the inner fastenings and provided with terminal and intermediate external annular flanges, open ended sleeves carried within the hub, bowed springs having their outer ends connected to the outer fastenings of the frame with their inner ends received between adjacent flanges of the hub, fastenings piercing the flanges of the hub and connecting the springs thereto, and a rubber cushion snugly embraced by the sleeves, the inner annular series of fastenings constituting stops for engagement by the sleeves when the hub has been displaced beyond a predetermined limit.

6. A wheel comprising a central body having axle receiving openings therein, a rim, spokes rigidly connecting the rim and central body, a hub between the spokes and opposite portions of the body and movable independently thereof, a yielding connection between the hub and the rim and means within the hub for limiting its movement.

7. A wheel comprising a central body having axle receiving openings therein, a rim, spokes rigidly connecting the rim and central body, a hub between the spokes and opposite portions of the body and movable independently thereof, a yielding connection between the hub and the rim, a cushion included within the hub and disposed to bear upon an axle within the body openings, and stop devices secured to the central body and movably disposed within the hub.

In testimony that I claim the foregoing as my own, I have hereto affixed my signature in the presence of two witnesses.

JOHN NASH.

Witnesses:
C. S. VAN BRUNDT,
J. E. LEONARD.